(12) United States Patent
Dagani et al.

(10) Patent No.: US 12,026,799 B2
(45) Date of Patent: Jul. 2, 2024

(54) METHOD AND APPARATUS FOR SOFTWARE BASED PREEMPTION USING TWO-LEVEL BINNING TO IMPROVE FORWARD PROGRESS OF PREEMPTED WORKLOADS

(71) Applicant: Samsung Electronics Co., Ltd., Suwon-si (KR)

(72) Inventors: Gabriel T. Dagani, Austin, TX (US); Christopher P. Frascati, Liberty Hill, TX (US); Fnu Gurupad, San Jose, CA (US); David Tannenbaum, Austin, TX (US); Rama S. B. Harihara, San Jose, CA (US); Keshavan Varadarajan, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 89 days.

(21) Appl. No.: 17/357,964

(22) Filed: Jun. 24, 2021

(65) Prior Publication Data

US 2022/0301095 A1   Sep. 22, 2022

Related U.S. Application Data

(60) Provisional application No. 63/163,736, filed on Mar. 19, 2021.

(51) Int. Cl.
*G06T 1/20* (2006.01)
*G06F 9/48* (2006.01)

(52) U.S. Cl.
CPC ............... *G06T 1/20* (2013.01); *G06F 9/485* (2013.01); *G06F 9/4881* (2013.01)

(58) Field of Classification Search
CPC ......... G06T 1/20; G06F 9/485; G06F 9/4881; G06F 9/3877; G06F 9/5033; G06F 9/505; G06F 15/7807
See application file for complete search history.

(56) References Cited

U.S. PATENT DOCUMENTS

| 8,963,933 B2 | 2/2015 | Hartog et al. |
| 9,396,032 B2 | 7/2016 | Nalluri et al. |
| 9,842,376 B2 | 12/2017 | Acharya et al. |

(Continued)

*Primary Examiner* — James A Thompson
*Assistant Examiner* — Kim Thanh T Tran
(74) *Attorney, Agent, or Firm* — Renaissance IP Law Group LLP

(57) ABSTRACT

A system and a method are disclosed improving forward progress of preempted workloads. A graphics pipeline processes tiles of a first low-priority job. A controller stops the first job by resetting the GPU and preempting the first job with a second job having a higher priority, determine whether the first job has been previously preempted one or more times, and adjust a batch-binning parameter reducing a likelihood that the first job will again be preempted in the current frame. In one embodiment, the controller is configured to stop the first job at a preemption boundary during a draw call or by resetting the GPU. A batch-binning parameter may include postponing sorting primitives into tiles during a binning process, increasing a number of tiles for backend rendering, reducing a quality of anti-aliasing, decreasing a shading rate quality, and/or decreasing input resolution and increasing upscaling of the first job.

20 Claims, 6 Drawing Sheets

(56) References Cited

U.S. PATENT DOCUMENTS

| | | |
|---|---|---|
| 10,134,103 B2 | 11/2018 | Acharya et al. |
| 10,210,593 B2 | 2/2019 | Acharya et al. |
| 2017/0091895 A1* | 3/2017 | Acharya ................. G06F 9/461 |
| 2017/0161863 A1* | 6/2017 | Baral ...................... G06T 15/80 |
| 2018/0307533 A1 | 10/2018 | Tian et al. |
| 2020/0012576 A1* | 1/2020 | Cormack ............ G06F 11/2041 |
| 2020/0159587 A1* | 5/2020 | Li ......................... G06F 9/4881 |
| 2020/0226822 A1* | 7/2020 | Sundaram ............... G06T 3/403 |
| 2022/0156874 A1* | 5/2022 | Acharya ................. G06T 15/00 |
| 2022/0269340 A1* | 8/2022 | Hirvonen ................. G06T 3/40 |

\* cited by examiner

METHOD AND APPARATUS FOR SOFTWARE BASED PREEMPTION USING TWO-LEVEL BINNING TO IMPROVE FORWARD PROGRESS OF PREEMPTED WORKLOADS

CROSS-REFERENCE TO RELATED APPLICATION

This application claims the priority benefit under 35 U.S.C. § 119(e) of U.S. Provisional Application No. 63/163,736, filed on Mar. 19, 2021, the disclosure of which is incorporated herein by reference in its entirety.

TECHNICAL FIELD

The subject matter disclosed herein relates to graphic processing units (GPUs). More particularly, the subject matter disclosed here relates to a system and method for improving forward progress of preempted workloads.

BACKGROUND

In rendering environments having different priority workloads, it may occur that an ongoing graphical processing unit (GPU) workload may be preempted inflight to schedule a higher-priority workload. The granularity associated with such a preemption is GPU dependent because each GPU is only capable of resuming a graphics workload if the GPU has saved the complete working context into a memory at the granularity associated with the GPU. A very fine level of granularity may be comparatively expensive and complex to develop and maintain because it means relatively more context must be collected and saved into a memory before another context can be processed.

For a given GPU having only a draw-call level granularity of preemption, a workload may only be interrupted cleanly if the GPU fully completes a draw call. This level of granularity may be considered to be too coarse for some applications because a long uninterrupted draw call may starve other higher-priority applications. Also, there may be a potential to stall a lower-priority application by repeatedly stopping and restarting work so frequently that the lower-priority application becomes backlogged or irrelevant due to the timed nature of graphics output.

In a situation in which multiple workloads having different Quality of Service (QoS) priorities occur (i.e., a high priority workload and a low priority workload), preemption may be used to ensure that the high-priority workloads are not blocked from using the GPU. Because a draw-call level granularity may not be sufficiently good, preemption may be traditionally implemented by resetting the GPU in hardware or software, and dispatching the high-priority workload after GPU reset/startup. The low-priority job would then be resubmitted after the high-priority job is complete.

SUMMARY

An example embodiment provides a GPU that may include a graphics pipeline circuit and a controller circuit. The graphics pipeline circuit may process tiles of a first job during a draw call in which the first job has a first priority. The controller circuit is coupled to the graphics pipeline circuit and may be configured to: stop the first job by resetting the GPU to preempt the first job with a second job having a second priority that is greater than the first priority, determine whether the first job has been previously preempted one or more times, and adjust at least one of a batch-binning parameter and an image quality parameter to reduce preemption granularity and to reduce a likelihood that the first job will not be preempted. In one embodiment, the controller circuit may be further configured to stop the first job at a preemption boundary during a draw call or by resetting the GPU. In another embodiment, adjusting the batch-binning parameter may include postponing running tiles during a binning process of the GPU. In still another embodiment, adjusting the batch-binning parameter may include increasing a number of tiles for backend rendering by the GPU. In yet another embodiment, the GPU may support multi-sample anti-aliasing, and adjusting the batch-binning parameter may include reducing a quality of anti-aliasing. In another embodiment, the GPU may support variable rate shading, and adjusting the batch-binning parameter may include decreasing a shading rate quality. In still another embodiment, the GPU may be part of a System of a Chip, the GPU may support high quality upscaling, and adjusting the batch-binning parameter may include decreasing an input resolution of the first job and increasing an upscaling of the first job.

An example embodiment provides a method for preempting a job in a GPU that may include: stopping a first job being processed by the GPU by resetting the GPU in which the first job has a first priority; processing a second job by the GPU in which the second job may have a second priority that is greater than the first priority; determining, by a controller of the GPU, whether the first job has been previously preempted one or more times; and adjusting, by the controller of the GPU, a batch-binning parameter to reduce a likelihood that the first job will be preempted. In one embodiment, the method may further include stopping the first job at a preemption boundary during a draw call or by resetting the GPU. In another embodiment, adjusting the batch-binning parameter may include postponing sorting primitives into tiles during a binning process of the GPU. In still another embodiment, adjusting the batch-binning parameter may include increasing a number of tiles for backend rendering by the GPU. In yet another embodiment, the GPU may support multi-sample anti-aliasing, and adjusting the batch-binning parameter may include reducing a quality of anti-aliasing. In one embodiment, the GPU supports variable rate shading, and adjusting the batch-binning parameter may include decreasing a shading rate quality. In still another embodiment, the GPU may be part of a System on a Chip, the GPU may support high quality upscaling, and adjusting the batch-binning parameter may include decreasing an input resolution of the first job and increasing an upscaling of the first job.

An example embodiment provides a GPU that may include a graphics pipeline circuit and a controller circuit. The graphics pipeline circuit that processes tiles of a first job during a draw call in which the first job has a first priority. The controller circuit may be coupled to the graphics pipeline circuit, and may be configured to: stop the first job at a preemption boundary during a draw call or by resetting the GPU to preempt the first job with a second job having a second priority that is greater than the first priority, determine whether the first job has been previously preempted one or more times, and adjust a batch-binning parameter to reduce a likelihood that the first job will not be preempted. In one embodiment, adjusting the batch-binning parameter may include postponing sorting of primitives into tiles during a binning process of the GPU. In another embodiment, adjusting the batch-binning parameter may include increasing a number of tiles for backend rendering by the GPU. In yet another embodiment, the GPU may support multi-sample anti-aliasing, and adjusting the batch-binning parameter may include reducing a quality of anti-aliasing. In still another embodiment, the GPU may support variable rate shading, and adjusting the batch-binning parameter may include decreasing a shading rate quality. In one embodiment, the GPU may be part of a System on a Chip, the GPU may support high quality upscaling, and adjusting the batch-binning parameter may include decreasing an input resolution of the first job and increasing an upscaling of the first job.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figures 1A, 1B, 1C:
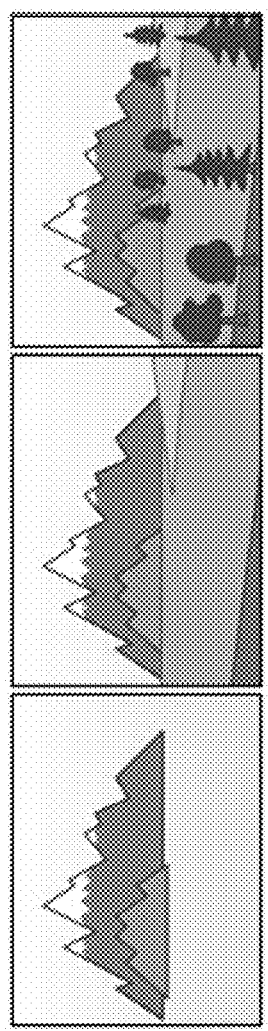
FIGS. 1A-1C depict an example framebuffer rendering of a scene for traditional Immediate Mode Rendering GPU architecture.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

The subject matter disclosed herein provides a preemption technique that improves forward progress of lower-priority draw calls that may be repeatedly preempted for higher-priority draws, thereby preventing an application using lower-priority draw calls from stalling caused by the repeated preemption interruptions. In one embodiment, a relatively long draw-call may be recognized using a system or hardware watchdog timer. For example, if a preemption timer reaches zero while a preemption request is pending, preemption of the lower-priority job may be forced. When a job is detected that has been interrupted using the watchdog timer, batch-binning-type rendering parameters may be adjusted to improve the likelihood that the low-priority job may make progress and eventually finish between high-priority preemption interruptions.

The batch-binning-type rendering parameters that may be adapted or changed to improve forward progress for interrupted low-priority jobs may include postponing the spatial sorting of vertex workloads into tiles (or bins) while already processed pixel tiles are being consumed by the pixel shaders to reduce binning preemption delay; incrementally increasing the number of tiles (or bins) for backend rendering (pixel shading) on a frame boundary that may reduce the work-unit size and improve chances of tile processing completion; turning off or reducing the quality of anti-aliasing if multi-sample anti-aliasing (MSAA) is supported by the GPU to temporarily speed up back-end processing; decreasing image quality by various techniques to improve the granularity of preemption. Examples of methods that decrease visual acuity (image quality) to reduce draw call intervals include: decreasing the pixel-shading rate if variable rate shading (VRS) is supported by the GPU; and/or decreasing the framebuffer resolution and later using an available (scaler can exist on the SoC, or as part of the GPU) image scaler to restore the pixel resolution at a degraded quality.

The subject matter disclosed herein also improves the QoS of a GPU having an inherent draw-call level preemption limitation. In one embodiment, an immediate-mode render (IMR) GPU includes a Two-Level Primitive Batch Binning (TLPBB) architecture and a heuristically tuned software-driven hardware GPU reset to provide a timer-based preemption granularity having an improved forward progress. TLPBB modules and/or circuits may be added between vertex/geometry stages and a rasterization stage of an IMR GPU architecture. The TLPBB circuits may localize geometries of a workload into tiles that may be binned to provide an improved bandwidth and performance. The TLPBB circuit also may improve GPU preemption granularity by dividing large pixel shader-based workloads into smaller jobs by increasing the number of tiles processed in a frame. This, in turn, may reduce a latency associated with preemption of work by dividing a pixel-rendering workload into smaller pixel groups if a higher-priority workload commandeers the GPU and preempts a lower-priority workload.

In one embodiment disclosed herein, a timer mechanism may be used to count down when a high-priority workload may preempt a lower priority workload. When the time to preemption is within a given threshold, a GPU driver may prevent new lower-priority workloads from being sent to the GPU, thereby allowing the workloads running to complete and to reduce the likelihood of having to restart a job that is lost due to a GPU reset. This may also prevent a frame buffer from being written with premature output that may affect read-after-write logic caused by a GPU reset.

Additionally, if the hardware or the software of a GPU driver recognizes a situation in which an LP job fails to progress after multiple preemptions, the driver software may make adjustments to the quality of the rendering of the lower-priority job by, for example, reducing multi-sample anti-aliasing (MSAA), altering VRS to output fewer pixels, or by increasing the number of the binned tiles (TLPBB) to improve the chance of the forward progress of the LP workload. Reducing the number of pixels sent to the shaders may likely reduce the total time needed to complete an LP job. Final upscaling of VRS is done in fairly constant time, and will be faster and use less energy than having computed all of the pixels in the pixel shader. The adjustments made by the driver may be considered to be in deference to a need to reduce the LP workload based on the LP job having access to fewer GPU resources to thereby improve preemption performance and QoS.

FIGS. 1A-1C depict an example cumulative framebuffer rendering of an example scene for traditional IMR GPU architecture. FIG. 1A depicts a first draw call ($D1_{LP}$) renders mountains in a scene for an example 30 frames per second (fps) low-priority (LP) job. FIG. 1B depicts a second draw call ($D2_{LP}$) renders landscape in the scene for the LP job. In FIG. 1C, a third draw call ($D3_{LP}$) renders trees for the LP job. In a traditional IMR GPU architecture, a workload may be preempted at completion of the entire framebuffer contents of a draw call. For the example shown in FIGS. 1A-1C, preemption is only available between each of the draw calls of FIGS. 1A-1C, that is between each of FIGS. 1A-1C. If, for example, rendering of the landscape for draw call $D2_{LP}$ takes a relatively long time, preemption by a higher-priority (HP) workload may be adversely delayed.

Figure 2:
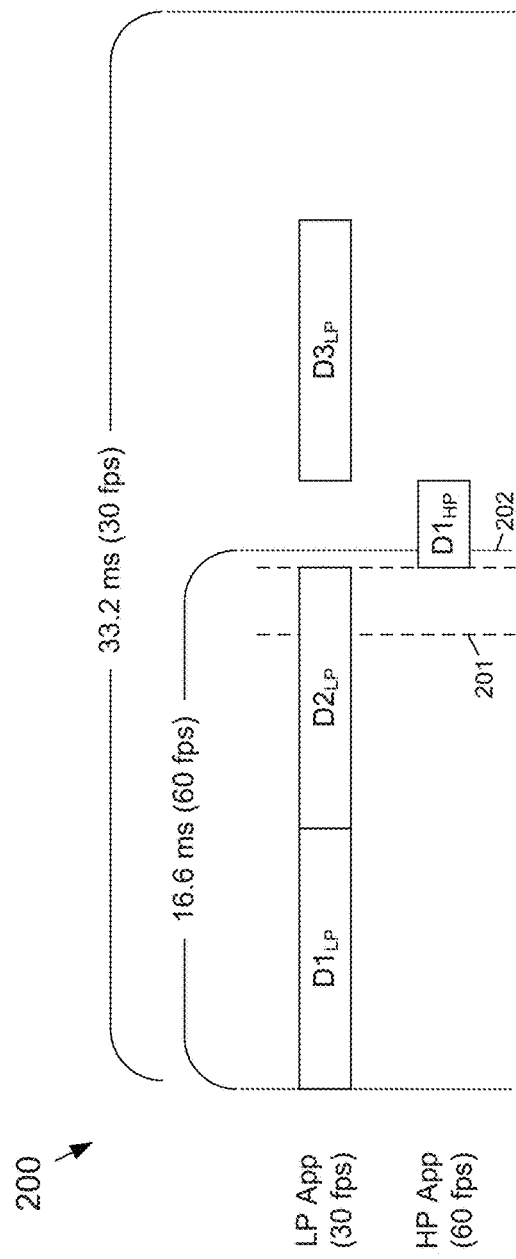
FIG. 2 is an example preemption timing diagram corresponding to the scene shown in FIGS. 1A-1C for a traditional IMR GPU architecture; HP: High Priority, LP: Low Priority. Dn: Time duration of a draw call n.

FIG. 2 is an example preemption timing diagram 200 corresponding to the scene shown in FIGS. 1A-1C for a traditional IMR GPU architecture. During the draw call $D2_{LP}$, a preemption request is received at time 201. For the traditional IMR GPU architecture, however, the preemption request cannot be performed until the end of the draw call $D2_{LP}$, which causes completion of the draw call for $D1_{HP}$ to occur after the 60 fps boundary at time 202. The high-priority work cannot start until the $D2_{LP}$ draw call has finished, which results in a dropped high-priority frame that cannot be updated until the next Vsync of the display.

According to the subject matter disclosed herein, a TLPBB architecture is used to complement an IMR-type GPU to improve efficiency and performance of a full-frame rendering engine. After vertex/primitive generation, a binning operation may be performed in hardware to split up, or divide, a workload into N×M number of tiles for each frame draw call that represent locally continuous rectangles of a framebuffer (in which N and M are integers). Each tile represents an asynchronous workload that collectively generates a final frame.

Figures 3A, 3B, 3C:
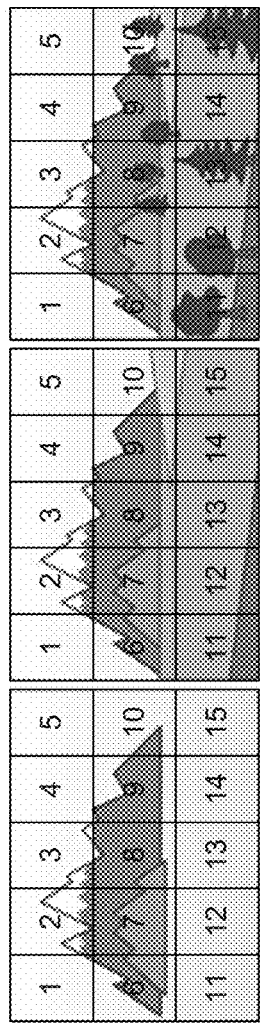
FIGS. 3A-3B depict an example of a workload that has been divided into example tiles by a GPU having a Two Level Primitive Batch Binning architecture for rendering the scene of FIG. 1 according to the subject matter disclosed herein.

FIGS. 3A-3B depict an example of a workload that has been divided into 15 example tiles by a GPU having a TLPBB architecture for rendering the example scene of FIG. 1 according to the subject matter disclosed herein. The content of each draw call has been divided into tiles, in this case, an example of 15 tiles. It should be understood that the content of each draw call could be divided into any number of tiles.

Figure 4:
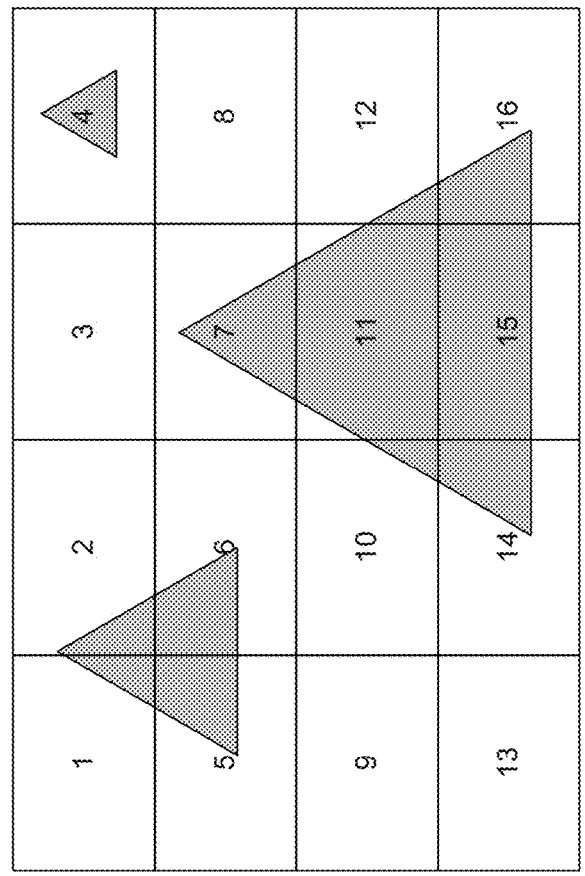
FIG. 4 shows another example workload for a TLPBB architecture that has been divided into an example number of tiles according to the subject matter disclosed herein.

FIG. 4 shows another example workload 400 for a TLPBB architecture that has been divided into 16 example tiles. The example workload 400 includes three triangles that respectively are in tiles 1, 2, 5 and 6, tile 4, and tiles 7, 10-12 and 14-16. In one embodiment, a TLPBB architecture operates by running a vertex processor twice. The first time the vertex processor is run, a scissors-type function is used for each tile and a vertex of a triangle is recorded if the vertex exists in a tile being batched. This is done for all draws of a whole frame, so in another situation a tile could have multiple draws of multiple vertices/triangles recorded for that tile. During a second pass of the TLPBB architecture (i.e., hardware of a vertex shader), a simple check of each tile to determine whether any work exists in the tile is performed, and if there is no work, the tile is discarded and the tile does not reach a pixel shader.

For the example workload 400, tiles 1, 2, 5 and 6 tiles will each have one triangle to draw. Tile 4 will have one triangle to draw, and tiles 7, 10-12 and 14-16 will have a triangle to draw. Tiles 3, 8, 9 and 13 will be discarded because there is no work in any of those tiles.

The TLPBB architecture allows a frame to be divided into any number of tiles, which is a tradeoff. As more tiles are formed, there is a corresponding increase in overhead for determining triangles in the tiles, with also a corresponding increase in the number of tiles that may be discarded. Additionally, this type of binning of triangles in tiles provided by TLPBB architecture is the work that may be halted to expedite pixel shader workloads if a relatively longer LP jobs is in flight.

Figure 5:
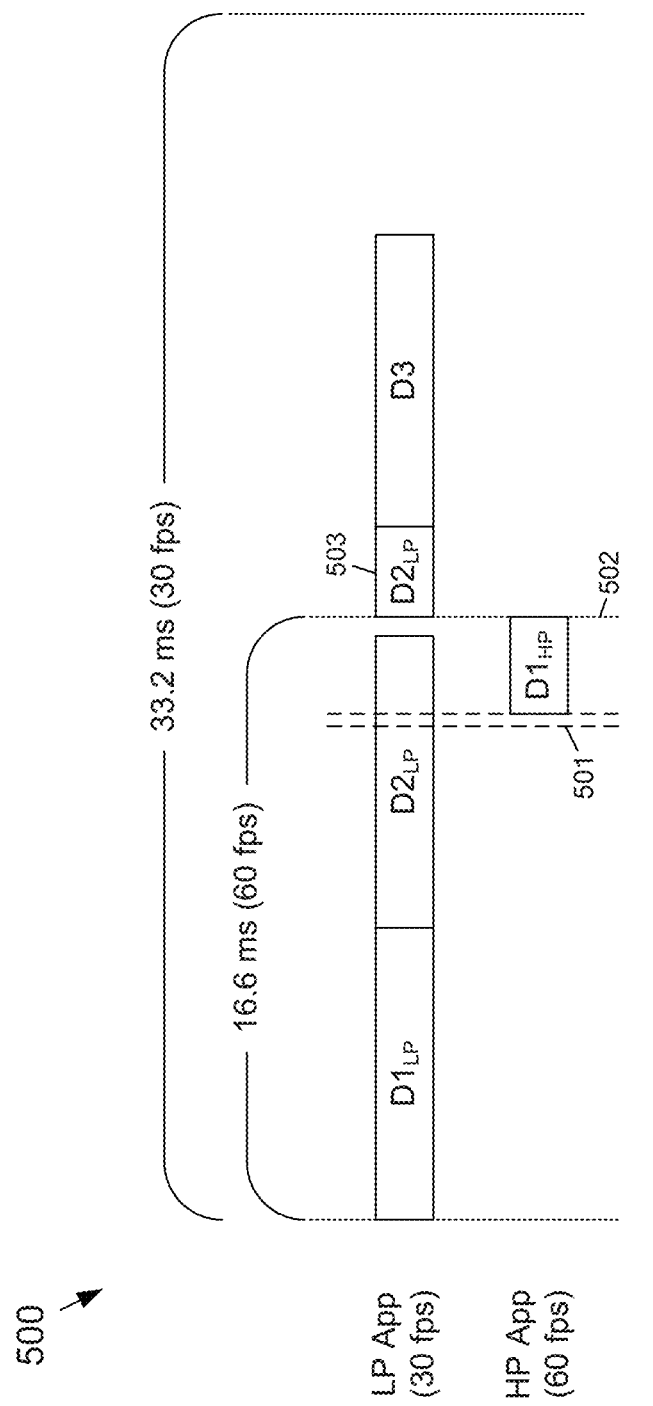
FIG. 5 is an example preemption timing diagram corresponding to the scene shown in FIGS. 3A-3C for a TLPBB architecture according to the subject matter disclosed herein.

FIG. 5 is an example preemption timing diagram 500 corresponding to the scene shown in FIGS. 3A-3C for a TLPBB architecture according to the subject matter disclosed herein. During the draw call $D2_{LP}$ in FIG. 5, a preemption request is received at time 501. For the TLPBB architecture, preemption may be performed at a tile boundary during a draw call so that completion of a draw call for $D1_{HP}$ may occur prior to the 60 fps boundary at time 502. A delay to respond to a preemption request at individual tiles may be proportionally shorter than a delay associated with rendering of a whole frame rendering before responding to a preemption request (like that depicted in FIG. 2). Only the tiles that have yet to be completed are resubmitted at time 503 for processing, which in one embodiment may be performed by hardware.

Traditional Tile Based Renderers (TBRs), such as IMR-type GPUs, may only support tile-level preemption. That is, preemption for TBR GPUs may only be available on a tile boundary after all draw calls have been completed for that tile. FIG. 6A is a block diagram of an example of a traditional IMR GPU architecture 600. The IMR GPU architecture 600 includes a vertex/primitive processing circuit 601, a binning circuit 602, a rasterization circuit 603 and a pixel processing circuit 604. The IMR GPU architecture 600 may include other circuits that are not shown. Preemption may occur at 605 after the binning circuit 602 has completed. Preemption may also occur at 606 during pixel processing at a tile-level granularity after all draw calls for a tile have sequentially completed. Although only three tiles are depicted in FIG. 6A as an example, it should be understood that pixel processing 604 may involve more than or fewer than three tiles.

Figure 6B:
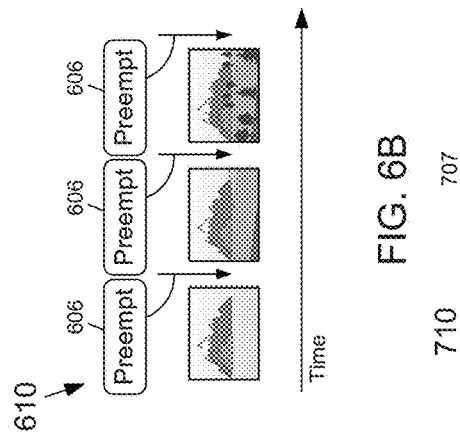
FIG. 6B depicts a relative time line for preemption during pixel processing for the IMR-type GPU architecture.
Figure 6A:
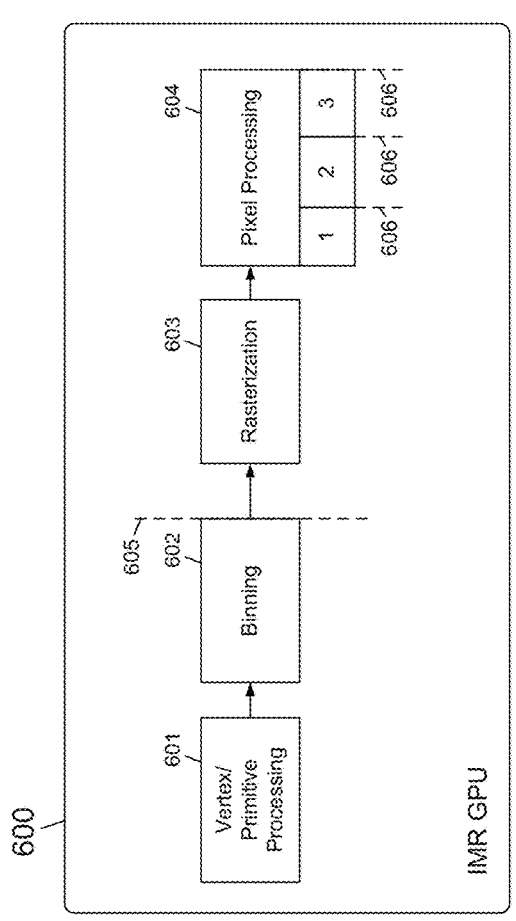
FIG. 6A is a block diagram of an example of a traditional IMR GPU architecture.

FIG. 6B depicts a relative time line 610 for preemption during pixel processing 604 for the IMR-type GPU architecture 600. Using the example scene and the number of tiles depicted in FIGS. 1A-1C, preemption occurs at 606 after each draw has successfully completed an entire pass over the whole frame. The processing time for a given draw call may vary depending upon the complexity of the contents of the draw. Also, although only three draws are depicted in FIG. 6A as an example, pixel processing 604 may involve more than or fewer than three draws.

In contrast to a traditional IMR-type GPU, preemption provided by a GPU having a TLPBB architecture is at a tile-level granularity during each draw call. FIG. 7A is a block diagram of an example of a TLPBB GPU architecture 700 according to the subject matter disclosed herein. The TLPBB GPU architecture 700 may include a controller circuit 701, a vertex/primitive processing circuit 702, a binning circuit 703, a rasterization circuit 704 and a pixel processing circuit 705. The vertex/primitive processing circuit 702, the binning circuit 703, the rasterization circuit 704 and the pixel processing circuit 705 may be referred to as a graphics pipeline. The TLPBB GPU architecture 700 may include other circuits that are not shown. Additionally, one or more of the circuits 701-705 may be configured as a module, which may be any combination of software, firmware and/or hardware configured to provide the functionality of the module. Although only three draws are depicted in FIG. 7A as an example, pixel processing 705 may involve more then or fewer than three draws.

The TLPBB GPU architecture 700 is configured so that rasterization 704 for each tile is performed in parallel. Additionally, pixel processing 705 for each tile is performed in independently of the pixel processing for all other tiles. The number of tiles being processed by the TLPBB GPU architecture 700 may be configurable based on a number of parameters, as described below.

A preemption boundary may occur at 706 after the binning circuit 702 has completed and work is passes to the rasterization circuit 704. Multiple preemption boundaries may also occur at 707 during pixel processing 705 at a tile-level granularity during a draw call.

Figure 7B:
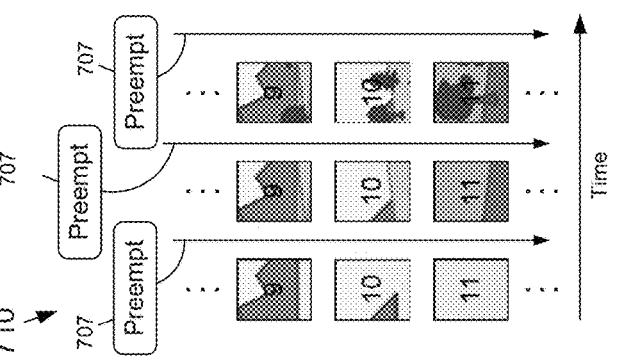
FIG. 7B depicts a relative time line for preemption during pixel processing for a TLPBB GPU architecture according to the subject matter disclosed herein.
Figure 7A:
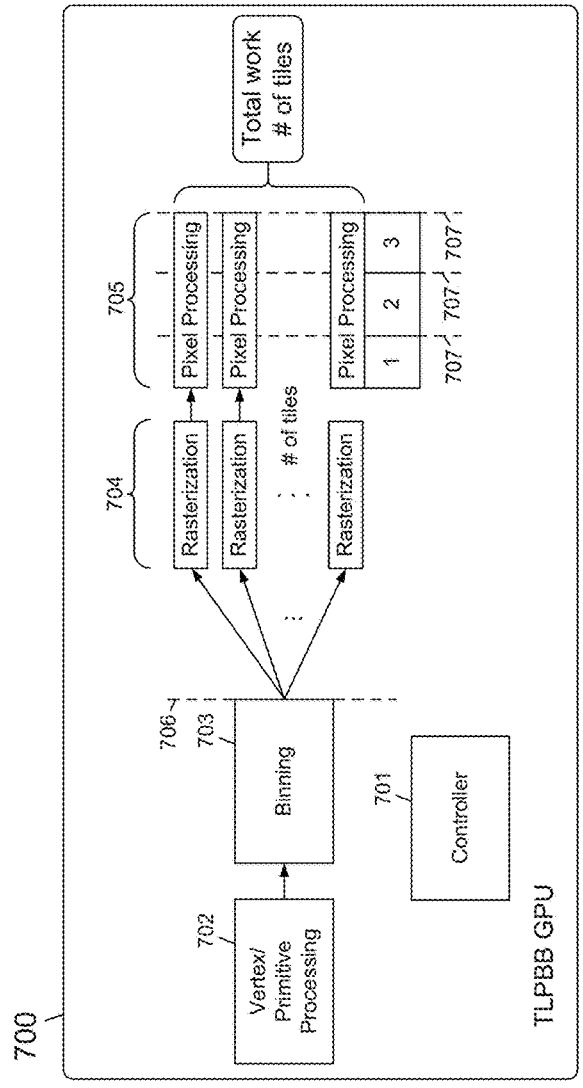
FIG. 7A is a block diagram of an example of a TLPBB GPU architecture according to the subject matter disclosed herein.

FIG. 7B depicts a relative time line 710 for preemption during pixel processing 705 for a TLPBB GPU architecture 700. Again using the example scene and the number of tiles depicted in FIGS. 3A-3C, preemption may occur at 707 at a tile-level granularity during a draw call. The parallel nature of the configuration provided by a TLPBB GPU architecture 700 results in all of the draws of a tile being completed independently, thereby significantly reducing the latency from the time a preemption request is received to the time that the preemption request may be processed because contexts may be swapped between draw calls binned for a single tile. Moreover, not only does the TLPBB architecture provide tile-level granularity during a draw call, but may also improve the likelihood of forward progress of a lower-priority job toward finishing a long draw call while potentially being repeatedly interrupted by higher-priority jobs.

Figure 8:
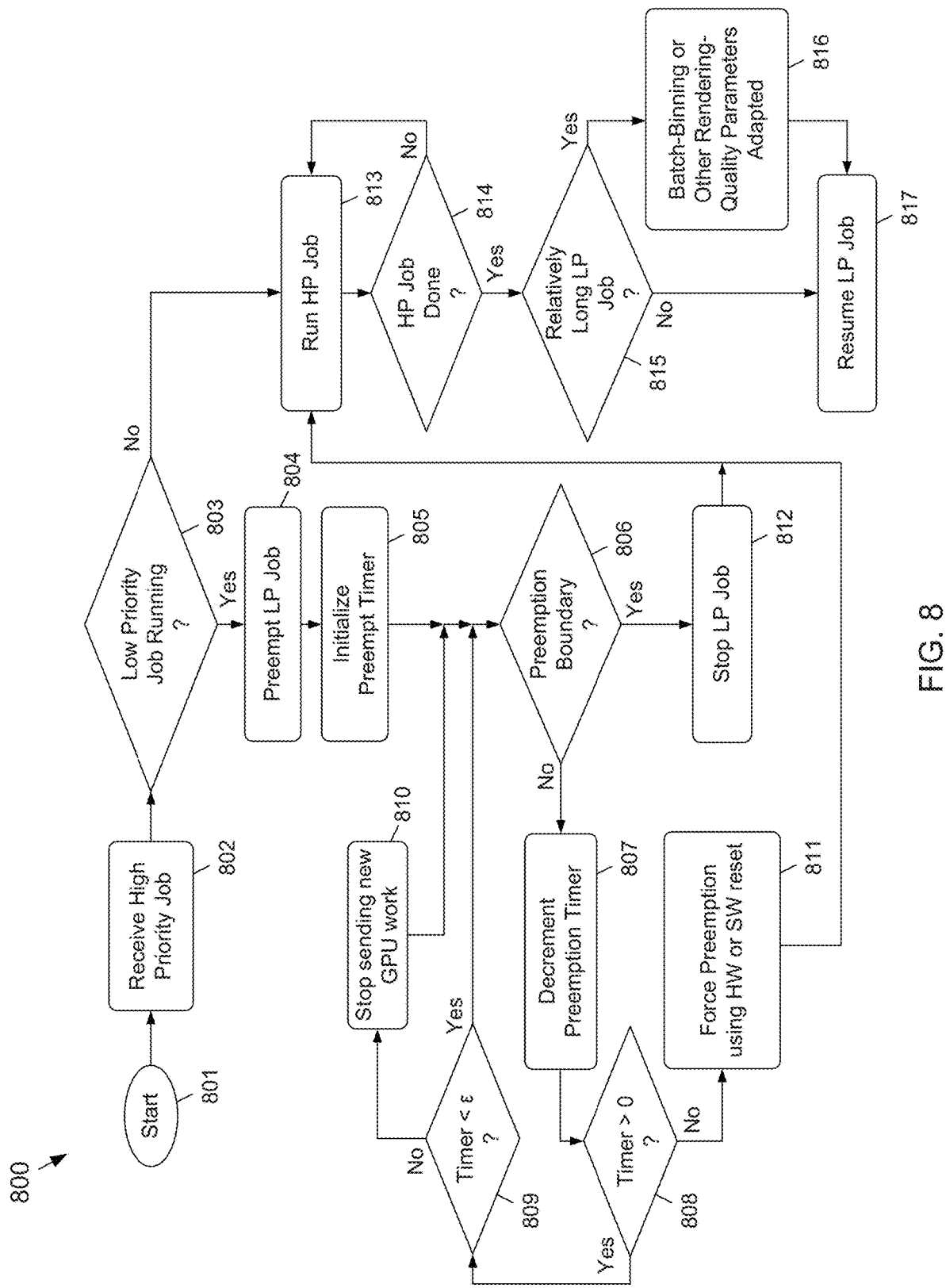
FIG. 8 is a flow diagram of an example embodiment of a method for responding to a preemption request using a TLPBB GPU architecture according to the subject matter disclosed herein.

The finer granularity provided by the TLPBB architecture 700 to the lower-priority task allows for less delay before a high-priority task may begin and thereby reduces the likelihood/need for a full reset to force the lower priority task to cede the GPU to the higher priority task. Because the high priority task may have usurped some of the frame time of the lower-priority task, by reducing the complexity of the remaining workload of the lower-priority task, it may be possible to have the lower-priority task complete within the reduced effective frame time it has available FIG. 8 is a flow diagram of an example embodiment of a method 800 for responding to a preemption request using a TLPBB GPU architecture according to the subject matter disclosed herein. The method starts at 801 in which a low-priority job may be being processed. At 802, a higher priority job is received. At 803, it is determined whether a low-priority job is being processed. If so, a request for the low-priority job to be preempted is generated at 804. If, at 803, it is determined that a low-priority job is not being processed, flow continues to 813 where the high-priority job is run.

From 804, flow continues to 805 where a preemption timer is initialized. The preemption timer may be a dedicated hardware or software timer. Based on a preemption time that may be user (i.e., designer) specified, the preemption timer should allow work to be completed and the GPU to be reset in a worst-case scenario. For an example of a 60 fps HP workload in which it is desired to always draw at 60 fps, the value of preemption timer should be selected to be sufficiently small, i.e., less than 1/60 fps, which would be 16 ms. To make sure that the GPU could be reset in ~1 ms with time for other jobs that could be assumed to take much less time, one example value for the preemption timer may be anywhere from 3-8 ms. Other values for the preemption timer may also be used.

Flow continues to 806 where it is determined whether processing is at a preemption boundary point, such as at 706 or 707 in FIG. 7A. If, at 806, processing is at a preemption boundary, flow continues to 813. If, at 806, processing is not at a preemption boundary, flow continues to 807 where the preemption timer is decremented. At 808, it is determined whether the preemption timer is greater than 0. If so, flow continues to 809 where it is determined whether the preemption timer is less than a threshold E. In one embodiment, the threshold ε may be 30 ms. If, at 809 it is determined that the preemption timer is not less that the threshold ε, flow continues to 810 where new work from the LP task is stopped from being sent to the GPU so that pipelines may empty. If, at 809, it is determined that the preemption timer is less than the threshold ε, flow returns to 806.

If, at 808, it is determined that the preemption timer equals 0, flow continues to 811 where the GPU driver is signaled to reset itself by either software or hardware; this may necessitate a re-initialization of the GPU with a new context; after which the high priority job may be first submitted, and then the entire low-priority job resubmitted since the previous draw call completion. The forced preemption may involve either a software reset or a hardware reset.

The conditions under which a software-based reset or a hardware-based reset is used for a preemption may prevent a lower-priority job from continuing between preemption boundaries. The specific technique for determining the conditions under which such a hardware or a software preemption reset is used may be GPU specific. For a software-based reset, all forward work may be stopped and a signal may be sent to the submodules or circuits of the GPU to discontinue work and discard current results. For a hardware-based reset, power rails to the GPU are turned off, and the GPU may be cold booted and initialized from scratch. Prior to reset, additional sub-draw work items that are typically sent to the GPU may be suspended when a preemption timer reaches a threshold ε value greater than 0. In some circumstances, this may provide an intentional draining of current work in the graphics pipeline to prepare for a potential hardware reset. If the pipeline is fully drained, then work may later continue without any work being lost before a SW/HW reset is performed. Additionally, suspending work when a preemption timer reaches a threshold ε may eliminate malformed partial draw calls due to read-after-write scenarios in memory after the GPU has been reset. Once the GPU has been is fully initialized, a preempting high-priority job may be started on an uncontested GPU.

Returning to FIG. 8, flow continues from 812 to 813 where the high-priority job is run. At 814, it is determined whether the high-priority job is done. If not, flow returns to 814. When the high-priority job is done, flow continues to 815, where it is determined whether the low-priority job is a relatively long draw call that may be repeatedly preempted by higher-priority jobs. If so, flow continues to 816 where batch-binning-type parameters may be adapted, or changed, and then to 817 where the low-priority job is resumed. If, at 815, it is determined that the low-priority job is not a relatively long draw call that may be repeatedly preempted, then flow continues to 817 where the low-priority job is resumed.

Adapting the batch-binning-type parameters at 816 of the method 800 may improve forward progress for lower-priority draws that may be repeatedly preempted by a higher-priority job. For example, consider the situation in which a low-priority draw call is relatively long. In such a situation, there is a possibility that if the draw call is resubmitted to the GPU after preemption, the lower-priority draw call may be repeatedly preempted, thereby causing an application to stall based on the continuous preemption interruptions.

The batch-binning-type parameters may be adapted, or modified, to avoid continuous preemption interruptions without dropping (e.g., giving up on) a draw call that is relatively long while making forward progress on the rendering to prevent a screen stall. In one embodiment, a relatively long draw-call may be recognized using a system or hardware watchdog timer. For example, if the timer reaches zero, a preemption may be forced (using a hardware or software GPU reset at 812) and the GPU driver may request to resubmit the same draw to be repeated. When a job is detected that has been interrupted using the watchdog timer, batch-binning-type parameters or other rendering parameters may be adjusted to improve the likelihood that the low-priority job may make progress and eventually finish between high-priority preemption interruptions. Information of the characteristics of a given LP job learning in one frame may be saved and applied as an initial expectation for the LP job's behavior in later frames.

The batch-binning-type parameters that may be adapted or modified to improve forward progress for interrupted low-priority jobs may include postponing calculating the tiles/bins while the binning process occurs to reduce binning preemption delay. Another parameter that may be adapted includes incrementally increasing the number of tiles/bins for backend rendering (pixel shading). Increasing the number of tiles/bins may reduce the work-unit size (i.e., the amount of work there is per bin,) and improve chances of tile/bin processing completion. In one embodiment, the number of tiles (or bins) may be further increased if the same draw is preempted, for example, twice. Non-TLPBB parameters that can be changed at 816 to improve preemption granularity include: If multi-sample anti-aliasing (MSAA) is supported, the quality of anti-aliasing may be turned off or reduced temporarily to speed up back-end processing. If variable rate shading (VRS) is supported, quality/shading rate may be decreased to improve performance at the cost of visual acuity for the low-priority job. If external high-quality upscaling is supported, the input resolution may be decreased and the upscaling may be increased.

Figure 9:
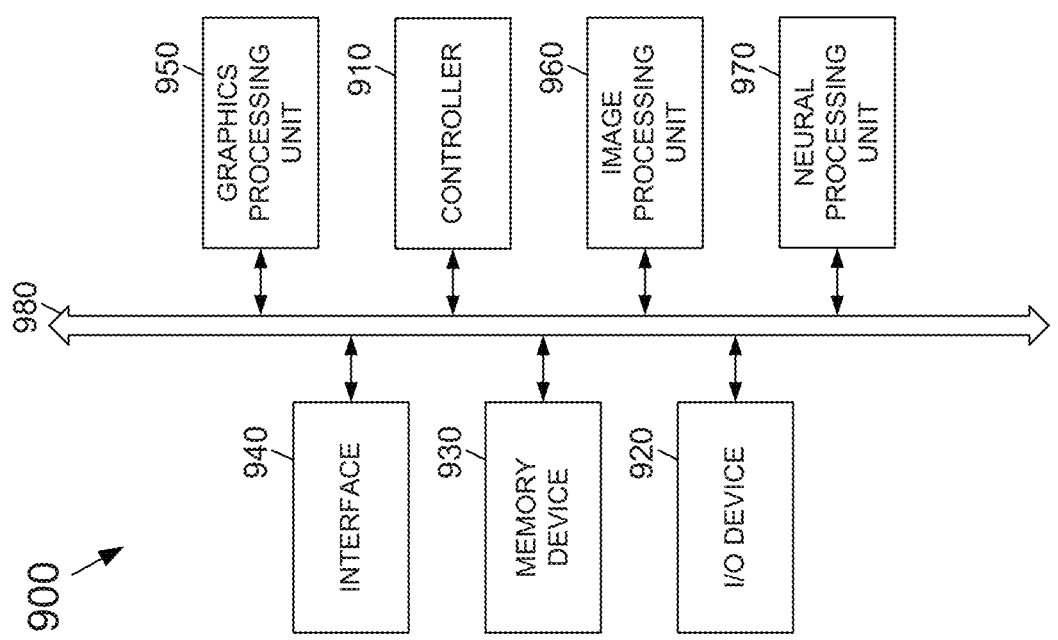
FIG. 9 depicts an electronic device that includes a GPU having a TPLBB architecture that provides a preemption technique that improves forward progress of lower-priority draw calls that may be repeatedly preempted for higher-priority draws, thereby preventing an application using lower-priority draw calls from stalling caused by the repeated preemption interruptions.

FIG. 9 depicts an electronic device 900 that includes a GPU having a TPLBB architecture that provides a preemption technique that improves forward progress of lower-priority draw calls that may be repeatedly preempted for higher-priority draws, thereby preventing an application using lower-priority draw calls from stalling caused by the repeated preemption interruptions. The electronic device 900 may include a controller (or CPU) 910, an input/output device 920 such as, but not limited to, a keypad, a keyboard, a display, a touch-screen display, a camera, and/or an image sensor, a memory 930, an interface 940, a GPU 950, an imaging-processing unit 960, and a neural processing unit 970 that are coupled to each other through a bus 980. The controller 910 may include, for example, at least one microprocessor, at least one digital signal processor, at least one microcontroller, or the like. The memory 930 may be configured to store a command code to be used by the controller 910 or a user data.

Electronic device 900 and the various system components of electronic device 900 may include the image processing unit 960, which may include a GPU having a TPLBB architecture that provides a preemption technique according to the subject matter disclosed herein. The GPU 950 may also have a TPLBB architecture that provides a preemption technique according to the subject matter disclosed herein. The interface 940 may be configured to include a wireless interface that is configured to transmit data to or receive data from a wireless communication network using a RF signal. The wireless interface 940 may include, for example, an antenna. The electronic system 900 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A graphics processing unit (GPU), comprising:
a graphics pipeline circuit that processes tiles of a first job during a draw call, the first job comprising a first priority; and
a controller circuit coupled to the graphics pipeline circuit, the controller circuit configured to:
set a preemption timer;
stop the first job by resetting the GPU to preempt the first job with a second job comprising a second priority that is greater than the first priority, determine whether the first job has been previously preempted one or more times, and
adjust at least one of a batch-binning parameter and an image quality parameter to reduce preemption granularity and to reduce a likelihood that the first job will not be preempted, wherein the resetting comprises discarding current results in a software reset or reinitializing the GPU in a hardware reset after the preemption timer has reached a threshold.

2. The GPU of claim 1, wherein the controller circuit is further configured to stop the first job at a preemption boundary during a draw call or by resetting the GPU.

3. The GPU of claim 1, wherein adjusting the batch-binning parameter comprises postponing running tiles during a binning process of the GPU.

4. The GPU of claim 1, wherein adjusting the batch-binning parameter comprises increasing a number of tiles for backend rendering by the GPU.

5. The GPU of claim 1, wherein the GPU supports multi-sample anti-aliasing, and
wherein adjusting the batch-binning parameter comprises reducing a quality of anti-aliasing.

6. The GPU of claim 1, wherein the GPU supports variable rate shading, and wherein adjusting the batch-binning parameter comprises decreasing a shading rate quality.

7. The GPU of claim 1, wherein the GPU is part of a System of a Chip (SoC), and the GPU that supports high quality upscaling, and
wherein adjusting the batch-binning parameter comprises decreasing an input resolution of the first job and increasing an upscaling of the first job.

8. A method for preempting a job in a graphics processing unit (GPU), the method comprising:
stopping a first job being processed by the GPU by resetting the GPU, the first job comprising a first priority;
processing a second job by the GPU, the second job comprising a second priority that is greater than the first priority;
determining, by a controller of the GPU, whether the first job has been previously preempted one or more times;

setting, by the controller of the GPU, a preemption timer; and
adjusting, by the controller of the GPU, a batch-binning parameter to reduce a likelihood that the first job will be preempted, wherein the resetting comprises discarding current results in a software reset or reinitializing the GPU in a hardware reset after the preemption timer has reached a threshold.

9. The method of claim 8, further comprising stopping the first job at a preemption boundary during a draw call or by resetting the GPU.

10. The method of claim 8, wherein adjusting the batch-binning parameter comprises postponing sorting primitives into tiles during a binning process of the GPU.

11. The method of claim 8, wherein adjusting the batch-binning parameter comprises increasing a number of tiles for backend rendering by the GPU.

12. The method of claim 8, wherein the GPU supports multi-sample anti-aliasing, and
wherein adjusting the batch-binning parameter comprises reducing a quality of anti-aliasing.

13. The method of claim 8, wherein the GPU supports variable rate shading, and
wherein adjusting the batch-binning parameter comprises decreasing a shading rate quality.

14. The method of claim 8, wherein the GPU is part of a System on a Chip (SoC) and the GPU supports high quality upscaling, and
wherein adjusting the batch-binning parameter comprises decreasing an input resolution of the first job and increasing an upscaling of the first job.

15. A graphics processing unit (GPU), comprising:
a graphics pipeline circuit that processes tiles of a first job during a draw call, the first job comprising a first priority; and
a controller circuit coupled to the graphics pipeline circuit, the controller circuit configured to:
set a preemption timer;
stop the first job at a preemption boundary during a draw call or by resetting the GPU to preempt the first job with a second job comprising a second priority that is greater than the first priority, determine whether the first job has been previously preempted one or more times, wherein the resetting comprises discarding current results in a software reset or reinitializing the GPU in a hardware reset after the preemption timer has reached a threshold; and
adjust a batch-binning parameter to reduce a likelihood that the first job will not be preempted.

16. The GPU of claim 15, wherein adjusting the batch-binning parameter comprises postponing sorting of primitives into tiles during a binning process of the GPU.

17. The GPU of claim 15, wherein adjusting the batch-binning parameter comprises increasing a number of tiles for backend rendering by the GPU.

18. The GPU of claim 15, wherein the GPU supports multi-sample anti-aliasing, and
wherein adjusting the batch-binning parameter comprises reducing a quality of anti-aliasing.

19. The GPU of claim 15, wherein the GPU supports variable rate shading, and wherein adjusting the batch-binning parameter comprises decreasing a shading rate quality.

20. The GPU of claim 15, wherein the GPU is part of a System on a Chip (SoC) and the GPU supports high quality upscaling, and wherein adjusting the batch-binning parameter comprises decreasing an input resolution of the first job and increasing an upscaling of the first job.

* * * * *